UNITED STATES PATENT OFFICE.

CHARLES S. VADNER, OF HUMBOLDT COUNTY, VIA BATTLE MOUNTAIN, NEVADA.

PROCESS FOR THE RECOVERY OF METALS FROM ORES AND THE LIKE.

1,236,236.                  Specification of Letters Patent.       Patented Aug. 7, 1917.

No Drawing.        Application filed November 27, 1916.    Serial No. 133,803.

*To all whom it may concern:*

Be it known that I, CHARLES S. VADNER, a citizen of the United States, and a resident of Humboldt county, via Battle Mountain, Nevada, have discovered a new and useful Process for the Recovery of Metals from Ores and the like, of which the following is a specification.

It is well known that in various smelting operations, in roasting ores and in various other operations that produce sulfurous gases that a large amount of obnoxious fumes are emitted into the air and that these fumes and gases are a source of annoyance and injury to animal and vegetable life. While the mechanical impurities contained in these fumes can be fairly well arrested by the baghouse system and by the use of long flues and baffles, the sulfurous fumes and gases are but partially arrested or rendered innocuous by them.

One of the objects of my invention then is to utilize these sulfurous fumes and the contained heat and to render them harmless to all forms of life.

Another object of my invention is to provide an effective and inexpensive method of recovering metals from mineral matter and the like.

To accomplish these objects I make use of the heat and sulfurous gases contained in fumes, subjecting oxids, carbonates and sufficiently roasted sulfid ores containing copper, iron, zinc, lead, arsenic, antimony, cadmium, lime, bismuth and manganese, in the presence of a sufficient quantity of water, to the action of these sulfurous gases. By this means these metals are extracted and recovered from the ores and the fumes arrested and rendered harmless.

It will be understood that if desirable in cases where smelter fumes are not available, sulfur can be burnt in order to provide the necessary sulfurous gases for the reduction of ore.

Oxid, carbonated or sufficiently roasted sulfid ores are ground to the proper size and showered or sprayed in water down through the first of a series of solution towers. These towers are of suitable size and height according to the quantity of ore to be treated and the length of time the ore requires to be exposed. The sulfurous fumes are led into these solution towers and mingled with the sprayed ore pulp. By means of this spraying, every particle of ore is subjected to the action of the sulfurous gases, which, in the presence of water, effects the solution of the copper and zinc, some of the iron and arsenic and other metals contained as aforesaid in the ore. This solution falls to the sump at the bottom of the tower while the unused gases pass on to the next tower. These towers are interposed between the points in the flues where the sulfurous gases are all united and the point from which they are finally voided. The sulfurous fumes are drawn either by natural or artificial draft from the main flue in the base of the first tower and by a suitable flue led down into the base of a second tower, thence up through the tower and down again to the base of the third tower and so on throughout the series of towers and finally out of the stack. In each tower the fumes come in contact with the sprayed ore pulp so that the sulfurous gases may have a chance to unite with the metals, and fall to the sump at the bottom. As many towers can be interposed in the path of the sulfurous fumes as may be found necessary in order to expose sufficient ore requisitely long to take from the fumes all the sulfurous gases and render them harmless enough to be voided into the air. Where the smelter stack is built on an elevation with the flues leading thereto and with towers interposed in succession in the path of the flues, the sprayed ore pulp can be fed again to the successive towers by gravity, otherwise it can be drawn up by pumps.

The solution towers are built over sumps into which the solution of ore and dissolved sulfurous vapors and undissolved ore falls. If the settled and undissolved portion of the ore is found to contain sufficient values it is removed from the sump and sent to the smelter, where on account of the lead, iron, gold and silver it is very desirable.

The residues can be also treated by a saturated solution of a soluble chlorid, preferably salt. The lead and silver will be extracted, and possibly some of the gold. The insoluble residue is eliminated and the pregnant solution is passed over metals such as zinc and iron, preferably iron, the metals, chiefly lead and silver, being recovered in metallic form. The undissolved portion of the above mineral matter should be washed free from the original solvent before treatment with the saline solution.

I would not desire to limit myself to merely the use of sodium chlorid, but would use one or more, either separately or in combination, of the common soluble chlorids, such as those of magnesium, calcium, manganese, iron and copper. The recovery of the lead from such a chlorid solution can be hastened by a current of electricity applied in the ordinary manner, the insoluble salts of iron that are produced being recovered; likewise the soluble zinc salts in case the lead is recovered by the use of zinc.

The pregnant solution in some cases will not be free from lead and other metals, but if the solution is freed from acidity and oxidized with a suitable oxidizing agent the lead can practically be all precipitated onto the insoluble residue and recovered as aforementioned. The reduction of acidity and oxidization may be effected by means of air, by passing the solution over mineral matter and the like and by manganese compounds that can produce such an effect, such as $MnO_2$ and others. The above means can be used separately, in part, or in combination as may be for the purpose mentioned.

The lead, iron and zinc can be recovered in the form of metal and insoluble salts respectively, as mentioned before. The pregnant solution above mentioned after the elimination of the lead therefrom can be treated for the elimination and recovery of other metals.

The original pregnant solution while being freed of lead as above mentioned is also freed of iron, a procedure which is necessary in the subsequent recovery of the metals that may be found in the original pregnant solution from which the lead has been eliminated. In case the precipitation of the iron is not quite complete air and a metallic oxid or carbonate can be used to complete same.

The original pregnant solution being free from lead, iron and possibly some other metals, is treated with the oxid, hydrate and the carbonate also can be used, of a metal which will precipitate the manganese in the form, depending principally on the precipitant used, as may be. In the presence of a halogen element, compound and the like, such as bromin, chlorin, sodium hypochlorite or a mixture of same, the manganese will be precipitated in the form of a hydrated oxid. With the addition of a sufficiency of the haloid element, the black peroxid is obtained, same is separated, dried and becomes a valuable product. In the precipitation of the peroxid the solution can be kept slightly acid when found to be necessary in order to prevent the precipitation of other metals. The amount of precipitant used will be in accordance with the desired ends of the application of the process.

The above will serve to separate and recover lead, iron, manganese and other metals.

The metal zinc and compounds thereof can be used, also the compounds of calcium, potassium, sodium, magnesium, as above described.

Having described my invention, what I claim is:

1. A process of recovering manganese from mineral matter and the like which consists in treating a mineral acid solution of manganese maintained sufficiently acid, with a sufficiency of an oxygen compound of a metal and one of the halogen elements that can precipitate the manganese as an oxid.

2. A process of recovering manganese from mineral matter and the like which consists in treating a mineral acid solution of manganese maintained sufficiently acid, with a sufficiency of sodium hydrate and chlorin gas precipitating the manganese as an oxid.

3. A process of recovering manganese from mineral matter and the like which consists in treating a sulfur dioxid solution of manganese maintained sufficiently acid, with a sufficiency of an oxygen compound of a metal and chlorin that can precipitate the manganese as an oxid eliminating and recovering the oxid thus precipitated.

4. A process of recovering manganese from mineral matter and the like, containing zinc, which consists in treating a mineral acid solution of manganese with a sufficiency of an oxygen compound of a metal and chlorin that can precipitate the manganese as an oxid, meanwhile maintaining the solution slightly acid precipitating, eliminating and recovering the precipitated oxid of manganese.

5. A process of recovering manganese and other metals from mineral matter and the like, containing lead and manganese, which consists in treating the mineral matter, with sulfurous fumes containing sulfur dioxid gas in the presence of sufficient moisture, rejecting the lead as insoluble matter soluble in a saturated saline solution such as sodium chlorid and the like, separating the pregnant solution from the insoluble matter, treating the insoluble matter with a saline solution such as sodium chlorid and the like, recovering the lead and recovering the manganese from the original pregnant solution.

6. A process of recovering manganese from mineral matter and the like containing iron and manganese which consists in treating the mineral matter with a mineral acid such as sulfurous fumes in the presence of sufficient moisture suitably eliminating unnecessary acidity of solution, by oxidizing the solution with an oxygen compound of manganese that can oxidize the solution, precipitating, eliminating iron and recovering the manganese.

7. A process of recovering manganese from mineral matter and the like containing other metals which consists in treating the mineral matter with a mineral acid in the presence of sufficient moisture eliminating lead and iron by means of mineral matter and the like containing an oxygen compound of manganese that can effect such a reaction, separating the insoluble matter from the pregnant solution and recovering the manganese.

8. A process of recovering metals from mineral matter and the like which consists in treating the mineral matter with sulfurous fumes and the like in the presence of sufficient moisture, eliminating unnecessary acidity of solution and oxidizing the solution by passing same over mineral matter and the like containing an oxygen compound of manganese that can effect such a reaction whereby the lead and iron are eliminated from the solution as insoluble matter but soluble in a saline solution such as sodium chlorid and the like, on to the insoluble portion of the ore, eliminating same, treating the solution with the oxygen compound of a metal that can precipitate the manganese, eliminating and recovering same.

9. A process of recovering metals from mineral matter and the like which consists in treating the mineral matter with sulfurous fumes and the like in the presence of sufficient moisture, eliminating unnecessary acidity of solution and oxidizing the solution by passing same over mineral matter and the like containing any oxygen compound of manganese that can effect such a reaction whereby the lead and iron are eliminated from the solution as insoluble matter but the lead however being soluble in a saline solution such as sodium chlorid and the like, on to the insoluble portion of the ore, eliminating same, treating the solution with an oxygen compound of a metal in the presence of sufficient chlorin thereby precipitating and recovering the manganese as peroxid $MnO_2$.

CHARLES S. VADNER.

Witnesses:
DONNA MARGETTS,
MURRAY SHEPHERD.